United States Patent
Ko et al.

(10) Patent No.: US 8,806,888 B2
(45) Date of Patent: Aug. 19, 2014

(54) AIR-CONDITIONER WITH MULTI-STAGE COMPRESSOR AND PHASE SEPARATOR

(75) Inventors: Young Hwan Ko, Changwon-si (KR); Hyuk Soo Lee, Gimhae-si (KR); Bum Suk Kim, Changwon-si (KR); Sang Kyoung Park, Changwon-si (KR); Byung Soon Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1318 days.

(21) Appl. No.: 12/160,097

(22) PCT Filed: Jan. 3, 2007

(86) PCT No.: PCT/KR2007/000026
§ 371 (c)(1),
(2), (4) Date: Apr. 9, 2009

(87) PCT Pub. No.: WO2007/078144
PCT Pub. Date: Jul. 12, 2007

(65) Prior Publication Data
US 2009/0218077 A1   Sep. 3, 2009

(30) Foreign Application Priority Data

| Jan. 6, 2006 | (KR) | 10-2006-0001790 |
| Mar. 31, 2006 | (KR) | 10-2006-0029534 |
| Nov. 15, 2006 | (KR) | 10-2006-0112718 |
| Nov. 16, 2006 | (KR) | 10/2007-0113260 |

(51) Int. Cl.
*F25B 1/10* (2006.01)
*F25B 13/00* (2006.01)
*F25B 43/00* (2006.01)
*F25B 31/00* (2006.01)

(52) U.S. Cl.
CPC ......... *F25B 13/00* (2013.01); *F25B 2341/0662* (2013.01); *F25B 2313/02741* (2013.01); *F25B 1/10* (2013.01); *F25B 2600/0253* (2013.01); *Y02B 30/741* (2013.01); *F25B 2600/2509* (2013.01); *F25B 2400/075* (2013.01); *F25B 31/004* (2013.01); *F25B 2400/13* (2013.01); *F25B 43/00* (2013.01); *F25B 43/006* (2013.01); *F25B 2500/01* (2013.01); *F25B 2600/2519* (2013.01); *F25B 2400/23* (2013.01); *F25B 2400/0751* (2013.01)
USPC ................... 62/510; 62/512; 62/503; 62/505; 62/513; 62/196.2

(58) Field of Classification Search
USPC .................. 62/510, 512, 196.2, 503, 505, 513
See application file for complete search history.

(56) References Cited

U.S. PATENT DOCUMENTS

| 4,211,093 A * | 7/1980 | Midolo ........................... 62/505 |
| 4,323,109 A * | 4/1982 | Jaster ............................. 165/45 |
| 4,918,942 A * | 4/1990 | Jaster ............................. 62/335 |
| 5,271,238 A * | 12/1993 | Powell et al. ................. 62/228.4 |
| 5,692,394 A * | 12/1997 | Ozaki et al. .................... 62/509 |
| 6,966,192 B2 * | 11/2005 | Lifson et al. ................. 62/196.2 |
| 2004/0099008 A1 * | 5/2004 | Lee et al. ........................ 62/503 |
| 2006/0032267 A1 * | 2/2006 | Kamimura et al. ............. 62/498 |

FOREIGN PATENT DOCUMENTS

| JP | 5203270 A | 8/1993 |
| JP | 07-158982 | 6/1995 |
| JP | 11241693 A | 9/1999 |
| JP | 2001241780 A | 9/2001 |
| JP | 2003-130477 | 5/2003 |

\* cited by examiner

*Primary Examiner* — Cheryl J Tyler
*Assistant Examiner* — Orlando E Aviles Bosques
(74) *Attorney, Agent, or Firm* — McKenna Long & Aldridge LLP

(57) ABSTRACT

An air conditioning system includes a phase separator separating a gaseous refrigerant and a liquid refrigerant from a flowing refrigerant, an evaporator evaporating the liquid refrigerant separated by the phase separator, and at least one compressor including a first compressing part receiving the refrigerant via the evaporator and a second compressing part receiving both of the gaseous refrigerant separated by the phase separator and the refrigerant via the first compressing part.

8 Claims, 9 Drawing Sheets

AIR-CONDITIONER WITH MULTI-STAGE COMPRESSOR AND PHASE SEPARATOR

This application is a national phase filing of PCT Application Serial Number PCT/PCT/KR2007/000026, filed on Jan. 3, 2007, and claims the benefit of Korean Application Serial Nos. 10-2006-0001790, filed Jan. 6, 2006, 10-2006-0029534, filed Mar. 31, 2006, 10-2006-0112718, filed Nov. 15, 2006, and 10-2006-0113260, filed Nov. 16, 2006, each of which are hereby incorporated by reference herein in their entireties.

TECHNICAL FIELD

The present invention relates to an air-conditioning system, and more particularly, to a system for air conditioning and controlling method thereof. Although the present invention is suitable for a wide scope of applications, it is particularly suitable for expanding an operational area.

BACKGROUND ART

Generally, an air conditioner is a device for cooling or heating an indoor space by performing compression, condensation, expansion and evaporation of a refrigerant. And, the air conditioners are classified into a normal air conditioner including an outdoor unit and an indoor unit connected to the outdoor unit and a multi-type air conditioner including an outdoor unit and a plurality of indoor units connected to the outdoor unit. Moreover, the air conditioners are classified into a cooling air conditioner supplying a cool air only to an indoor space by driving a refrigerant cycle in one direction only and a cooling and heating air conditioner supplying a cool or hot air to an indoor space by driving a refrigerant cycle selectively and bi-directionally.

A configuration of an air conditioner according to a related art is explained with reference to FIG. 1 as follows.

FIG. 1 is a block diagram of an air conditioner according to a related art.

Referring to FIG. 1, an air conditioner according to a related art basically consists of a compressor 10, a condenser 30, an expansion valve 40, an evaporator 60, and a 4-way valve 20 to configure a cooling cycle. And, the respective elements of the related art air conditioner are connected to one another via a connecting pipe 70 playing a role as a passage for a refrigerant.

A process for operating the above-configured air-conditioning system to cool down an indoor space is explained according to a refrigerant flow as follows.

First of all, the gaseous refrigerant having exchanged heat with an indoor air in the evaporator 60 is introduced into the compressor 10. The gaseous refrigerant introduced into the compressor 10 is compressed at high temperature and pressure by the compressor 10.

Subsequently, the compressed gaseous refrigerant is introduced into the condenser 30 to undergo a phase change into a liquid refrigerant. In particular, the refrigerant changes its phase in the condenser 30 to emit heat externally.

The refrigerant discharged from the condenser 30 expands via the expansion valve 40 and is then introduced into the evaporator 60.

The liquid refrigerant introduced into the evaporator 60 changes its phase into a gaseous refrigerant. In doing so, the phase-changing refrigerant absorbs external heat to cool an indoor space.

Besides, in order to heat the indoor space, a flow of refrigerant is switched by the 4-way valve 20 to operate the cooling cycle in a reverse direction.

DISCLOSURE OF INVENTION

Technical Problem

However, the related art air conditioner has the following problems.

First of all, the operational area of the related art air conditioner depends on the capacity of the compressor to be limited.

Secondly, in case of operating the air conditioner in a hot environment, refrigerant temperature and pressure are high. The refrigerate having the high temperature and pressure is introduced into the compressor to raise a compression work of the compressor. So, the performance of the compressor is reduced and operational efficiency of the air conditioner is lowered.

Thirdly, a constant work is given to the compressor even if a required load for the related art air conditioner is varied. So, power consumption is unnecessarily raised and operational efficiency is degraded.

Technical Solution

Accordingly, the present invention is directed to a system for air conditioning and controlling method thereof that substantially obviate one or more of the problems due to limitations and disadvantages of the related art.

One aspect of the present invention is to provide a system for air conditioning and controlling method thereof, by which an operational area is expanded.

Another aspect of the present invention is to provide a system for air conditioning and controlling method thereof, by which reliability and performance of a compressor are enhanced.

Another aspect of the present invention is to provide a system for air conditioning and controlling method thereof, by which operational efficiency is raised.

Another aspect of the present invention is to provide a system for air conditioning and controlling method thereof, by which a simple operational method is provided.

Another aspect of the present invention is to provide a system for air conditioning and controlling method thereof, by which a manufacturing cost is reduced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an air-conditioning system according to the present invention includes a phase separator separating a gaseous refrigerant and a liquid refrigerant from a flowing refrigerant, an evaporator evaporating the liquid refrigerant separated by the phase separator, and at least one compressor including a first compressing part receiving the refrigerant via the evaporator and a second compressing part receiving both of the gaseous refrigerant separated by the phase separator and the refrigerant via the first compressing part, wherein a volume of a first cylinder of the first compressing part is different from a volume of a second cylinder of the second compressing part.

The air-conditioning system may further include a refrigerant introducing device guiding the refrigerant via the phase separator to each of the first and second compressing parts.

The refrigerant introducing device may include an intermediate refrigerant pipe connecting the first compressing part and the second compressing part together to provide a space for mixing the gaseous refrigerant separated by the phase separator and the refrigerant via the evaporator together, a first refrigerant pipe guiding the gaseous refrigerant separated by the phase separator to the intermediate refrigerant pipe, and a second refrigerant pipe connecting the phase separator and the evaporator together to guide the refrigerant via the evaporator to the first compressing part.

In this case, the refrigerant introducing device further includes a refrigerant control valve controlling a flow of the gaseous refrigerant introduced into the intermediate refrigerant pipe.

And, the at least one compressor includes a plurality of compressors including first and second compressors independently operable. Moreover, the first refrigerant pipe includes a first main refrigerant pipe connected to the phase separator, a first diverging pipe diverging from the first main refrigerant pipe to be connected to the first compressor, and a second diverging pipe diverging from the first main refrigerant pipe to supply the gaseous refrigerant to the second compressor.

In this case, the air-conditioning system further includes a gaseous refrigerant adjusting device adjusting a flow of the gaseous refrigerant introduced into each of a plurality of the compressors.

And, each of a plurality of the compressors includes a constant speed compressor having a predetermined compression capacity regardless of an externally applied load.

Moreover, the first compressor includes a variable compressor having a compression capacity variable according to an externally applied load and the second compressor includes a constant speed compressor having a constant compression capacity regardless of the externally applied load.

Besides, the gaseous refrigerant adjusting device includes an on/off valve provided to the first main refrigerant pipe to control the flow of the gaseous refrigerant.

The gaseous refrigerant adjusting device may include an auxiliary electronic expansion valve provided to the first diverging pipe to adjust a quantity of the gaseous refrigerant introduced into the first compressor and an on/off valve provided to the second diverging pipe to adjust a quantity of the gaseous refrigerant introduced into the second compressor.

The first refrigerant pipe may include a first gaseous refrigerant pipe enabling the gaseous refrigerant discharged from the phase separator to flow into the first compressor and a second gaseous refrigerant pipe provided parallel with the first gaseous refrigerant pipe to enable the gaseous refrigerant discharged from the phase separator to flow into the second compressor.

In this case, each of the first and second compressors includes a variable compressor having a compression capacity variable according to an external load.

The first refrigerant pipe may include a capillary tube for adjusting a flux of the gaseous refrigerant according to a thickness.

The volume of the second cylinder may amount to 40-80% of the volume of the first cylinder.

The phase separator may include a storage container for storing the gaseous and liquid refrigerants mixed with each other therein, a mixed refrigerant pipe connecting part guiding the mixed refrigerant to the storage container, a first refrigerant pipe connecting part discharging the separated gaseous refrigerant, and a second refrigerant pipe connecting part discharging the separated liquid refrigerant.

The phase separator may further include a separating plate provided under the first refrigerant pipe connecting part to remove particles from the gaseous refrigerant discharged to the first refrigerant pipe connecting part and prevent the liquid refrigerant from being introduced into the first refrigerant pipe connecting part.

In this case, the storage container includes a body part, an upper wall provided to an upper end portion of the body part to be upwardly convex, and a lower wall provided to a lower end portion of the body part to be downwardly convex. The first refrigerant pipe connecting part is provided to a most upper end of the upper wall. A lower end portion of the mixed refrigerant pipe connecting part and a lower end portion of the second refrigerant pipe connecting part are dipped in the mixed refrigerant to be spaced apart from the lower wall with a prescribed gap in-between.

And, at least one of a lower end portion of the mixed refrigerant pipe connecting part and a lower end portion of the second refrigerant pipe connecting part is configured to be bent.

In this case, each of the lower end portion of the mixed refrigerant pipe connecting part and the lower end portion of the second refrigerant pipe connecting part is configured to be bent in a circumferential direction of the body part of the storage container.

The air-conditioning system may further include a barrier wall provided between a lower end portion of the mixed refrigerant pipe connecting part and a lower end portion of the second refrigerant pipe connecting part to prevent a flow of the refrigerant discharged from the mixed refrigerant pipe connecting part from affecting the second refrigerant pipe connecting part or the first refrigerant pipe connecting part.

In this case, a height of the barrier wall is 1-2 times greater than a diameter of the storage container.

To further achieve these and other advantages and in accordance with the purpose of the present invention, a method of controlling an air-conditioning system includes a step of separating a gaseous refrigerant and a liquid refrigerant from a flowing refrigerant, a step of evaporating the separated liquid refrigerant using an evaporator, and a compressor controlling step of controlling at least one compressor having a first compressing part provided with a first cylinder receiving the refrigerant via the evaporator and a second compressing part provided with a second cylinder supplied with both of the separated gaseous refrigerant and the refrigerant via the first compressing part to have a volume different from that of the first cylinder.

The compressor controlling step may include a refrigerant adjusting step of adjusting a low of the gaseous refrigerant introduced into the compressor.

The compressor controlling step may further include the steps of having the first compressing part compress the refrigerant via the evaporator and having the second compressing part compress the separated gaseous refrigerant and the refrigerant compressed by the first compressing part wherein the separated gaseous refrigerant and the refrigerant compressed by the first compressing part are mixed with each other.

In the refrigerant adjusting step, if the compressors include a plurality of constant speed compressors, the flow of the gaseous refrigerant is controlled by an on/off mode. In the refrigerant adjusting step, if the at least one compressor includes a variable compressor, the flow of the gaseous refrigerant introduced into the variable compressor is controlled by an opening degree of an electronic expansion valve. And, in the refrigerant adjusting step, a quantity of the gaseous refrigerant introduced into the at least one compressor is adjusted according to a thickness of a first refrigerant pipe in which the separated gaseous refrigerant flows.

It is to be understood that both the foregoing general description and the following detailed description are exemplary and explanatory and are intended to provide further explanation of the invention as claimed.

Advantageous Effects

The present invention provides the following effects or advantages.

First of all, by supplying a refrigerant via a first compressing part to a second compressing part together with a gaseous refrigerant separated by a phase separator, the present invention can reduce a compression work applied to a compressor and increase overall efficiency of an air-conditioning system.

Secondly, by providing a plurality of compressors each of which includes a first compressing part receiving a gaseous refrigerant via an evaporator and a second compressing part receiving a gaseous refrigerant separated by a phase separator and the gaseous refrigerant discharged from the first compressing part, the present invention is able to extend an operational area of an air-conditioning system.

Specifically, even if a compressor having a same capacity is used, it is able to extend an operational area of an air-conditioning system by differentiating a first cylinder of the compressor from a second cylinder of the compressor in volume. Hence, the present invention is able to extend an operational area in a cold area.

Thirdly, by adjusting a quantity of a gaseous refrigerant supplied to a constant speed or variable compressor according to an externally applied load using a gaseous refrigerant adjusting device, the present invention is able to efficiently operate an air-conditioning system.

Fourthly, by improving a configuration and shape of a phase separator, the present invention is able to prevent a liquid refrigerant from being introduced into a compressor and increase reliability of the compressor.

In particular, by bending a lower end portion of a mixed refrigerant pipe connecting part and a lower end portion of a second refrigerant pipe connecting part, the present invention is able to prevent a turbulent flow within a phase separator. By providing a barrier wall between the mixed refrigerant pipe connecting part and the second refrigerant pipe connecting part, the present invention is able to prevent a flow of a refrigerant discharged from the mixed refrigerant pipe connecting part from affecting the second refrigerant pipe connecting part or a first refrigerant pipe connecting part.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

BRIEF DESCRIPTION OF THE DRAWINGS

The accompanying drawings, which are included to provide a further understanding of the invention, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings.

First of all, a system for air conditioning according to a first embodiment of the present invention is explained with reference to FIG. 2 as follows.

Figure 1:
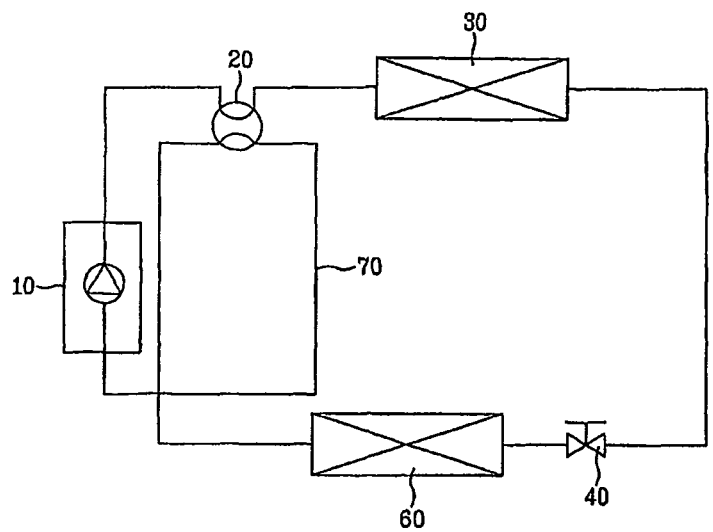
FIG. 1 is a configurational block diagram of an air conditioner according to a related art.
Figure 2:
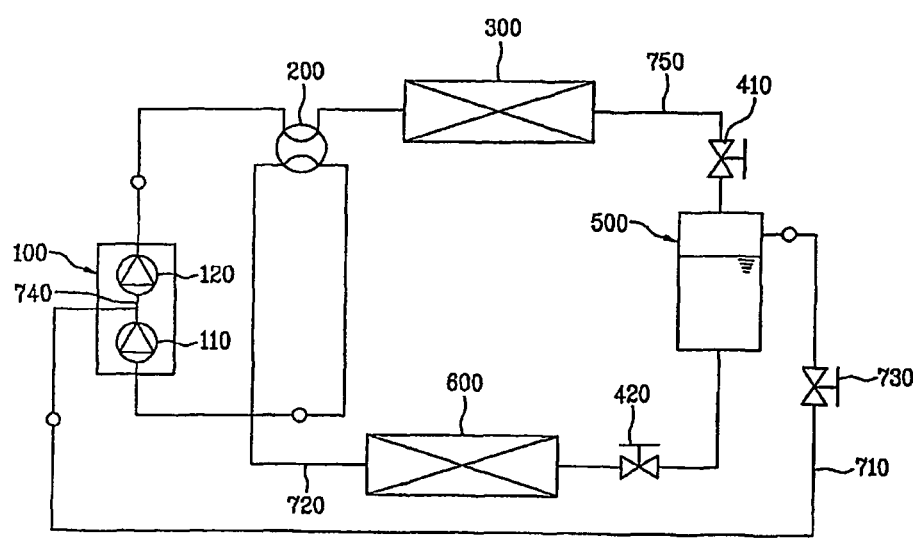
FIG. 2 is a configurational block diagram of a system for air conditioning according to a first embodiment of the present invention.

FIG. 2 is a configurational block diagram of a system for air conditioning according to a first embodiment of the present invention.

Referring to FIG. 2, a system for air conditioning according to a first embodiment of the present invention includes an evaporator 600, a condenser 300, a pair of expansion valves 410 and 420, a compressor 100, and a phase separator 500 separating an introduced refrigerator into a gaseous refrigerant and a liquid refrigerant.

And, the air-conditioning system includes a 4-way valve 200 controlling a refrigerant supplied to the condenser 300, the compressor 100 and the evaporator 600. In the following description, the air-conditioning system is explained according to a refrigerant flow in activating a cooling operation to cool an indoor space.

The compressor 100 includes a first compressing part 100 into which the refrigerant via the evaporator 600 is introduced and a second compressing part 120 into which the gaseous refrigerant separated by the phase separator 500.

In particular, the first compressing part 110 is provided with a first cylinder (cf. '111' in FIG. 4) into which the refrigerant via the evaporator is introduced and the second compressing part 120 is provided with a second cylinder (cf. '121' in FIG. 4) having a volume different from that of the first cylinder.

A refrigerant introducing device is provided between the phase separator 500 and the compressor 100 to guide the refrigerant to the first compressing part 110 and the second compressing part 120.

The refrigerant introducing device includes an intermediate refrigerant pipe 740 connected to the first and second compressing parts 110 and 120 and a refrigerant control valve 730 controlling a flow of the gaseous refrigerant introduced into the second compressing part 120. It is a matter of course that the refrigerant introducing device can include a first refrigerant pipe 710 connecting the intermediate refrigerant pipe 740 and the separator 500 together and a second refrigerant pipe 720 connecting the first compressing part 110 and the phase separator 500 together.

A pair of the expansion valves 410 and 420 include a first expansion valve 410 primarily expanding the refrigerant having passed through the condenser 300 and a second expansion valve 420 expanding the liquid refrigerant separated by the phase separator 500. The refrigerant having passed through the condenser 300 is in an over-cooled state. And, the refrigerant expands while passing through the first expansion valve 410. The expanding refrigerant including the gaseous and liquid refrigerants mixed together is then introduced into the phase separator 500.

The phase separator 500 is provided between the first and second expansion valves 410 and 420 and plays a role in separating the refrigerant into the liquid refrigerant and the gaseous refrigerant. The phase separator 500 is connected to a mixed refrigerant pipe 750 in which the refrigerant having passed through the condenser 300 flows, the first refrigerant pipe 710 in which the gaseous refrigerant separated by the phase separator 500 flows, and the second refrigerant pipe 720 in which the liquid refrigerant separated by the phase separator 500 flows.

The liquid refrigerant separated by the phase separator 500 is expanding while passing through the second expansion valve 420. The expanding refrigerant via the second expansion valve 420 is then introduced into the evaporator 600 to turn into a gaseous refrigerant through phase change. The gaseous refrigerant via the evaporator 600 is then introduced into the compressor 100, i.e., the first compressing part 110 via a 4-way valve 200.

After having flown along the first refrigerant pipe 710, the gaseous refrigerant separated by the phase separator 500 is mixed in the intermediate refrigerant pipe 740 with the refrigerant via the first compressing part 110. The refrigerant mixed in the intermediate refrigerant pipe 740 is introduced into the second compressing part 120 to be compressed and is then discharged from the compressor 100.

The phase separator 500 is able to include any device capable of separating a gaseous refrigerant from a refrigerant having passed through the condenser 300. For instance, the phase separator 500 provided with a heat exchanger enables the refrigerant via the condenser 300 to make a heat exchange with an external air to obtain the gaseous refrigerant from the corresponding refrigerant.

A refrigerant control valve 730 is provided to the first refrigerant pipe 710 to control a flow of the gaseous refrigerant. The refrigerant control valve 730 is controlled by a controller controlling an operation of the air-conditioning system. And, the controller plays a role in driving the first and second compressing parts 110 and 120 and controlling the refrigerant control valve 730.

A capillary tube can be separately provided to the first refrigerant pipe 710 to adjust a flux of the gaseous refrigerant introduced into the intermediate refrigerant pipe 740. In particular, a quantity of the gaseous refrigerant introduced into the intermediate refrigerant pipe 740 can be adjusted in a manner of adjusting a size of an inner diameter of the first refrigerant pipe 710.

Consequently, since the second compressing part 120 compresses the gaseous refrigerant separated by the phase separator 500 and the refrigerant compressed by the first compressing part 110 together, a compression work applied to the compressor 100 is reduced. As the compression work of the compressor 100 is reduced, an operational range of the compressor 100 is increased. Hence, the increased operational range of the compressor 100 enables the air-conditioning system to be usable in an extremely cold or tropical zone.

Optionally, the present invention is able to prevent the gaseous refrigerant from being introduced into the second compressing part 120 in a manner of turning of the refrigerant control valve in case of an early stage of an operation of the air-conditioning system or in case of checking reliability of the air-conditioning system.

The air-conditioning system according to the present invention is able to operate the compressor 100 in a zone having a low external load by turning off the refrigerant control valve. For instance, if an external load lies in a preset specific load zone, the controller turns off the refrigerant control valve 730 to drive the first compressing part 110 only. If so, the gaseous refrigerant separated by the phase separator 500 is not further introduced into the second compressing part 120 to enable the phase separator 500 to play a role as a receiver.

Optionally, it is able to activate the second compressing part 120 only or both of the first and second compressing parts 110 and 120 while the gaseous refrigerant separated by the phase separator is not supplied to the intermediate refrigerant pipe, i.e., while the refrigerant control valve is turned off. In this case, the controller is able to decide an external load according to an external temperature detected by a detecting sensor or a temperature designated by a user.

A pressure-enthalpy change process of the air-conditioning system according to the present invention is explained with reference to FIG. 2 and FIG. 3 as follows.

Figure 3:
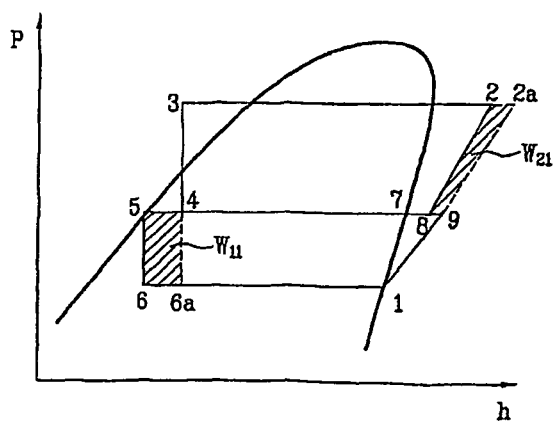
FIG. 3 is a graph of pressure-enthalpy for the air-conditioning system shown in FIG. 2.

FIG. 3 is a graph of pressure-enthalpy for the air-conditioning system shown in FIG. 2.

Referring to FIG. 2 and FIG. 3, a cooling cycle in a general air-conditioning system includes a compression process $1 \to 2a$, a condensation process $2a \to 3$, an expansion process $3 \to 6a$, and an evaporation process $6a \to 1$.

Yet, a cooling cycle of the air-conditioning system according to the present invention includes a compression process $1 \to 9 \to 8 \to 2$, a condensation process $2 \to 3$, an expansion process $3 \to 4 \to 5 \to 6$, and an evaporation process $6 \to 1$.

The compression process of the present embodiment includes a first compression process $1 \to 9$ and a second compression process $8 \to 2$. The first compression process indicates a compression process taking place in the first compressing part 110 and the second compression process indicates a compression process taking place in the second compressing part 120.

In this case, a start point of the second compression process is shifted to a point-8 from a point-9. This is because the gaseous refrigerant separated by the phase separator 500 is introduced into the second compressing part 120 via the intermediate refrigerant pipe 740. Namely, the gaseous refrigerant separated by the phase separator 500 is preferentially mixed with the refrigerant via the first compressing part 110 and is then introduced into the second compressing part 120, whereby enthalpy of the entire refrigerant is lowered.

Consequently, the gaseous refrigerant separated by the phase separator 500 is mixed with the refrigerant compressed by the first compressing part 110 and then supplied to the second compressing part 120. Hence, a compression work required fro the compressor is reduced by W21 and entire energy efficiency of the system is increased.

The expansion process of the present embodiment includes a first expansion process 3→4 and a second expansion process 5→6. The first expansion process indicates an expansion process taking place in the first expansion valve 410 and the second expansion process indicates an expansion process taking place in the second expansion valve 420.

In this case, a start of the second expansion process is shifted to a point-5 from a point-4. Namely, a work W11 is gained. This is because the gaseous refrigerant is separately separated from the refrigerant introduced into the phase separator 500 to flow into the first refrigerant pipe 710. In other words, as the gaseous refrigerant is removed from the phase separator 500, enthalpy of the refrigerant introduced into the evaporator is reduced. Hence, heat-exchange efficiency of the evaporator 600 is raised to enhance cooling performance of the air-conditioning system.

As the gaseous refrigerant separated by the phase separator 500 is supplied to the compressor 100 as well as the refrigerant via the evaporator 600, a circulation quantity of the refrigerant is increased to increase a capacity of the compressor 100. Hence, the capability of the air-conditioning system is enhanced.

Optionally, the present invention further includes a heat exchanger provided between the first and second refrigerant pipes to make a heat exchange between the gaseous refrigerant separated by the phase separator 500 and the refrigerant having passed through the evaporator 600. So, the enthalpy of the refrigerant introduced into the compressor can be further reduced, whereby a compression work required fro the compressor can be further reduced.

A compressor and a refrigerant introducing device guiding a refrigerant to the compressor according to the present invention are explained with reference to FIG. 4 as follows.

Figure 4:
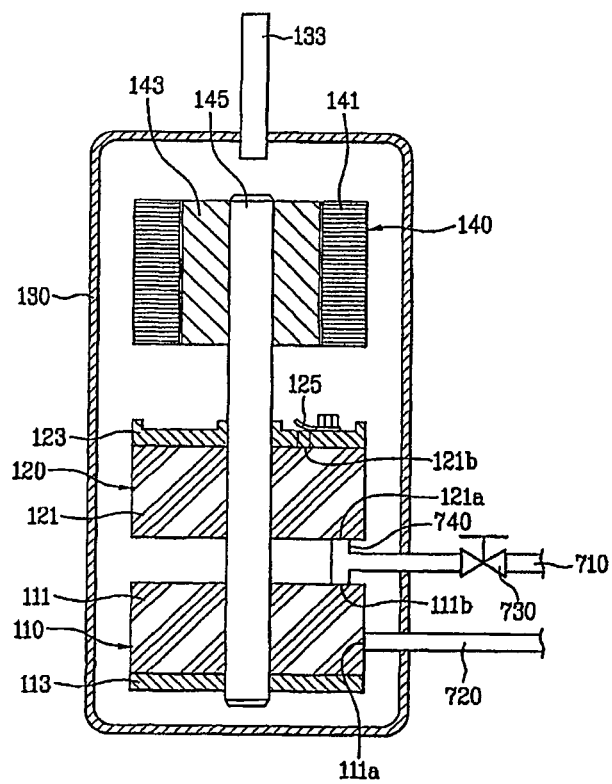
FIG. 4 is a cross-sectional diagram of a compressor provided to the air-conditioning system shown in FIG. 2.

FIG. 4 is a cross-sectional diagram of a compressor provided to the air-conditioning system shown in FIG. 2.

Referring to FIG. 4, the compressor includes a case 130 configuring an exterior of the compressor, a driving device 140 provided within the case 130, a first compressing part 110 driven by the driving device, and a second compressing part 120 driven by the driving device.

The driving device 140 includes a stator 141 having a coil wound thereon and a rotator 143 rotatably loaded in the stator 141. A rotational shaft 145 is inserted in the rotator 143. And, the rotational shaft 145 is connected to the first and second compressing parts 110 and 120.

The first and second compressing parts 110 and 120 are provided to one compressor with capacities variable according to an external load. The first compressing part 110 is provided to a lower part of the case 130. And, the second compressing part 120 is provided above the first compressing part 110. Optionally, an intermediate plate can be provided between the first and second compressing parts 110 and 120 to partition the first and second compressing parts 110 and 120 from each other.

The first compressing part 110 includes a first cylinder 111 providing a space for compressing a refrigerant therein and a first bearing 113 loaded beneath the first cylinder 111. And, the second compressing part 120 includes a second cylinder 121 providing a space for compressing a refrigerant therein and a second bearing 123 loaded on the first cylinder 111.

Alternatively, the first bearing can be loaded on the first cylinder and the second bearing can be loaded beneath the second cylinder.

A first cylinder inlet IIIa for introducing a refrigerant via an evaporator therein is provided to one side of the first cylinder 111, while a first cylinder outlet 11 Ib for discharging the refrigerant compressed within the first cylinder 111 is provided to the other side of the first cylinder 111. Optionally, a first opening/closing valve opening/closing the first cylinder outlet 11 Ib can be provided to the first cylinder outlet 11 Ib.

A second cylinder inlet 121a for introducing the refrigerant compressed by the first compressing part 110 and a gaseous refrigerant separated by the phase separator therein is provided to one side of the second cylinder 121, while a second cylinder outlet 121b for discharging the refrigerant compressed within the second cylinder 121 is provided to the other side of the second cylinder 121. And, a second opening/closing valve 125 opening/closing the second cylinder outlet 121b can be provided to the second cylinder outlet 121b.

Alternatively, a multi-step compressor having at least three compressing devices can be used as the compressor. In particular, it is able to employ at least one compressing device for the gaseous refrigerant separated by the phase separator.

The refrigerant control valve 730 is provided to the first refrigerant pipe 710 to control a gaseous refrigerant flowing within the first refrigerant pipe 710. The first refrigerant pipe 710 is connected to the intermediate refrigerant pipe 740. And, the intermediate refrigerant pipe 740 is configured to communicate with the inlet 121b of the second cylinder 121. Moreover, the intermediate refrigerant pipe 740 communicates with the outlet 11 Ib of the first cylinder 111 as well. So, the refrigerant compressed by the first cylinder 111 and the gaseous refrigerant separated by the phase separator are simultaneously introduced into the second cylinder to be compressed therein.

An operation process of the air-conditioning system using the above-configured compressor is explained as follows.

First of all, once an activation of the air-conditioning system is initiated, the compressor 100 having the first and second compressing parts 110 and 120, the compressor 300, the phase separator 500, the expansion valves 410 and 420, and the evaporator 600 are driven.

The phase separator 500 preferentially separates a gaseous refrigerant and a liquid refrigerant from a flowing refrigerant.

Subsequently, the liquid refrigerant separated by the phase separator 500 is introduced into the evaporator 600 and the gaseous refrigerant separated by the phase separator 500 is introduced into the intermediate refrigerant pipe 740 connected to the compressor. In this case, the controller simultaneously drives both of the first and second compressing parts 110 and 120 and turns on the refrigerant control valve 730 to enable the gaseous refrigerant separated by the phase separator 500 to be introduced into the intermediate refrigerant pipe 740.

The liquid refrigerant introduced into the evaporator 600 changes it phase into a gaseous refrigerant and then expands via the second expansion valve 420. The gaseous refrigerant via the second expansion valve 420 is then introduced into the first compressing part 110 provided to the compressor 100.

Subsequently, the refrigerant compressed by the first compressing part 110 is introduced into the intermediate refrigerant pipe 740. The refrigerant mixed in the intermediate refrigerant pipe 740 is then introduced into the second compressing part 120 provided to the compressor 100 to be compressed therein.

In particular, the refrigerant via the evaporator is introduced into the first cylinder 111 via the inlet 11 Ia of the first cylinder 111 to be compressed therein. The refrigerant compressed in the first cylinder 111 is then introduced into the intermediate refrigerant pipe 740 via the first outlet 11 Ib.

If so, the gaseous refrigerant separated by the phase separator 500 and the refrigerant compressed by the first compressing part 110 come into contact with each other in the intermediate refrigerant pipe 740 and are then introduced into the inlet 121a of the second cylinder 121 together to be compressed therein.

Thereafter, the refrigerant compressed by the second cylinder 121 is discharged from the second cylinder 121 via the second outlet 121b and is then introduced into the condenser via the compressor outlet 1333 provided to the case.

A volume of the first cylinder 111 is different from that of the second cylinder 121. And, a compression rate of the first compressing part 110 is different from that of the second compressing part 120. In particular, assuming that the volume of the first cylinder 111 is 100, the volume of the second cylinder 121 is about 40-80. And, experimental details of the volumes and compression rates will be explained with reference to FIG. 15 later.

Of course, the compressor can be activated while the gaseous refrigerant is not introduced into the intermediate refrigerant pipe. In particular, the refrigerant via the phase separator entirely passes through the evaporator to be introduced into one side of the first compressing part 110, i.e., the inlet 11 Ia of the first cylinder 111. The introduced refrigerant is then compressed by the first cylinder 111 according to an activation of the driving device.

The compressed refrigerant is introduced into the intermediate refrigerant pipe 740 via the outlet 11 Ib of the first cylinder 111. The refrigerant introduced into the intermediate refrigerant pipe 740 is then introduced into the second cylinder 121. Yet, it is optional whether a refrigerant compression takes place in the second cylinder 121. A presence or non-presence of the refrigerant compression within the second cylinder 121 depends on a range of an external load.

A system for air conditioning according to a second embodiment of the present invention is explained with reference to FIG. 5 as follows.

A configuration of the air-conditioning system of the second embodiment of the present invention is similar to that of the first embodiment of the present invention. Yet, in the second embodiment of the present invention, a plurality of compressors, each having a first compressing part and a second compressing part, are provided. In this case, a first compressor uses the same reference number of the former compressor provided to the aforesaid air-conditioning system.

Figure 5:
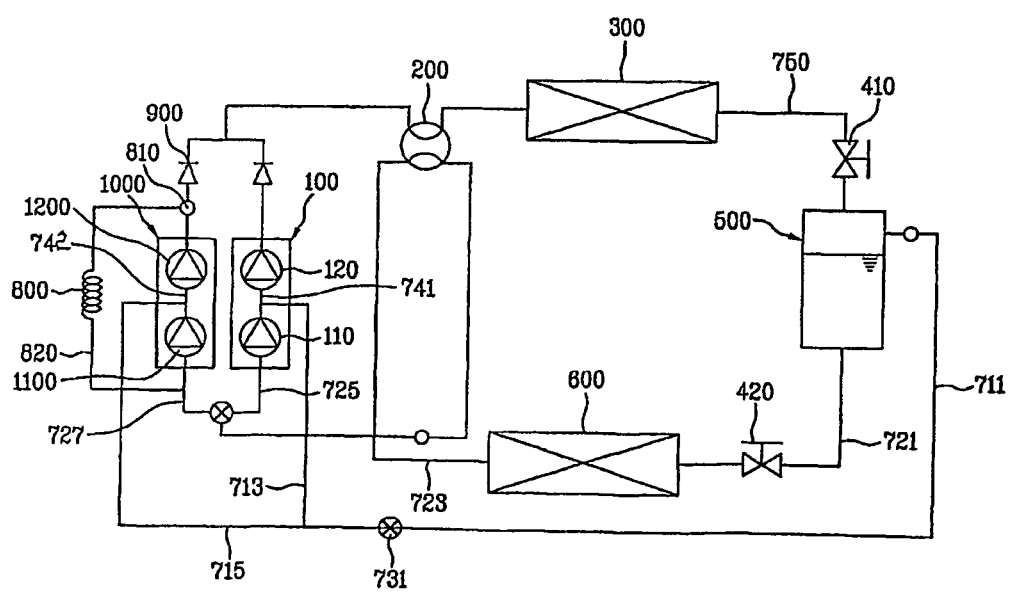
FIG. 5 is a configurational block diagram of a system for air conditioning according to a second embodiment of the present invention.

FIG. 5 is a configurational block diagram of a system for air conditioning according to a second embodiment of the present invention.

In the following description, an air-conditioning system including a pair of compressors 100 and 1000, and more particularly, a pair of constant speed compressors along a refrigerant flow in driving a cooling operation to cool an indoor space.

Referring to FIG. 5, a plurality of compressors, which are arranged parallel with each other between an evaporator and a condenser to be independently operable, include a first compressor 100 and a second compressor 1000. Alternatively, the first and second compressors 100 and 1000 can be arranged serial to each other.

In this case, the first compressor 100 includes a first compressing part 10 into which a refrigerant via the evaporator is introduced and a second compressing part 120 into which a gaseous refrigerant separated by a phase separator is selectively introduced. And. the second compressor 1000 includes a first compressing part 1100 into which a refrigerant via the evaporator is introduced and a second compressing part 1200 into which a gaseous refrigerant separated by a phase separator is selectively introduced.

An oil supply pipe 820 is connected to the first and second compressors 100 and 1000 to supply oil necessary for an operation of the corresponding compressor. A capillary tube 800 is provided to the oil supply pipe 820 to expand the oil. And, the other side of the oil supply pipe 820 is connected to an oil separator 810. Moreover, a check valve 900 is provided to exit sides of the first and second compressors 100 and 1000 to prevent a back flow of the refrigerant.

And, the air-conditioning system includes a plurality of refrigerant pipes leading the gaseous refrigerant separated by the phase separator 500 to the first and second compressors 100 and 1000.

In particular, the air-conditioning system includes a first refrigerant pipe connecting the phase separator and the intermediate refrigerant pipe and a second refrigerant pipe connecting the phase separator, the evaporator, and the first compressing part.

The first refrigerant pipe includes a first main refrigerant pipe 711 for a flow of the gaseous refrigerant discharged from the phase separator 500, a first diverging pipe 713 diverging from the first main refrigerant pipe 711 to be connected to the first intermediate refrigerant pipe 741 of the first compressor, and a second diverging pipe 715 diverging from the first main refrigerant pipe 711 to be connected to the second intermediate refrigerant pipe 742 of the second compressor.

The second refrigerant pipe connects the phase separator 500 and the evaporator 600 together. And, the second refrigerant pipe includes a liquid refrigerant pipe 721 for a flow of the liquid refrigerant separated by the phase separator 500 and an evaporator connecting pipe 723 connecting the evaporator and the 4-way valve together to supply the refrigerant to the first compressions parts 110 and 1100 of the first and second compressors. And, the second refrigerant pipe includes a first diverging connecting pipe 725 diverging from the evaporator connecting pipe 723 to supply the refrigerant to the first compressing part 10 of the first compressor and a second diverging connecting pipe 727 diverging from the evaporator connecting pipe 723 to supply the refrigerant to the first compressing part 110 of the second compressor.

So, the refrigerant via the evaporator 600 passes in a state of the gaseous refrigerant through the 4-way valve 200 and then diverges to be introduced into the first compressing part 110 of the first compressor and the first compressing part 1100 of the second compressor.

Optionally, the air-conditioning system may include a heat exchanger (not shown in the drawing) enabling the refrigerant via the evaporator 600 and the gaseous refrigerant separated by the phase separator 500 to exchange heat with each other. In particular, the heat exchanger has a dual pipe configuration so that heat exchange can be performed in a manner of partitioning the refrigerant pipe for a flow of the refrigerant via the evaporator and the refrigerant pipe for a flow of the gaseous refrigerant separated by the phase separator from each other.

Hence, since the gaseous refrigerant discharged from the phase separator and the refrigerant via the evaporator are made to flow by crossing with each other, the heat exchanger is able to induce more uniform and quick heat exchange.

Explained in the following description is the case that both of the first and second compressors perform compression processes using the gaseous refrigerant separated by the phase separator.

First of all, the liquid refrigerant separated by the phase separator 500 changes its phase into a gaseous refrigerant via the evaporator 600. The corresponding gaseous refrigerant moves along the first diverging connecting pipe 725 and the second diverging connecting pipe 727 and are then introduced into the first compressing part 110 of the first compressor and the first compressing part 1100 of the second compressor.

The gaseous refrigerant compressed by the first compressing part 110 of the first compressor meets the gaseous refrigerant introduced from the first diverging pipe 713 at the first intermediate refrigerant pipe 741 to be mixed with each other therein. The mixed gaseous refrigerant is introduced into the second compressing part 120 of the first compressor to be compressed again.

The gaseous refrigerant introduced into the first compressing part 1100 of the second compressor meets the gaseous refrigerant introduced from the second diverging pipe 715 at the second intermediate refrigerant pipe 742 to be mixed with each other therein. The mixed gaseous refrigerant is then introduced into the second compressing part 1200 of the second compressor to be compressed therein.

Subsequently, the gaseous refrigerant discharged from the second compressing part 1200 of the first compressor and the gaseous refrigerant discharged from the second compressing part 1200 of the second compressor meet with each other to move to the 4-way valve 200.

Meanwhile, the first main refrigerant pipe 711 is provided with a gaseous refrigerant adjusting device that adjusts a flow of the gaseous refrigerant introduced into a plurality of the compressors. Various devices can be used as the gaseous refrigerant adjusting device. In the present embodiment, an on/off valve 731 adjusting a flow of the refrigerant flowing in the first main refrigerant pipe 711. And, the on/of valve 731 is installed on the first main refrigerant pipe 711 before the first and second diverging pipes 713 and 715 are connected.

So, in driving the first and second compressors using the gaseous refrigerant separated by the phase separator, the on/off valve 731 is turned on. Of course, in case of not using the gaseous refrigerant separated by the phase separator 500, the on/off valve 731 shall be turned off. In particular, since the on/off valve 731 keeps being turned off in case of performing a reliability test of the air-conditioning system or in the early stage of the activation of the air-conditioning system, it is able to operate the air-conditioning system without a separate introduction of the gaseous refrigerant into the compressors.

Optionally, the on/off valve can be provided to each of the first and second diverging connecting pipes 725 and 727. Alternatively, the on/off valve is not provided to the first main refrigerant pipe 711 but the on/off valve can be provided to each of the first and second diverging pipes.

Figure 6:
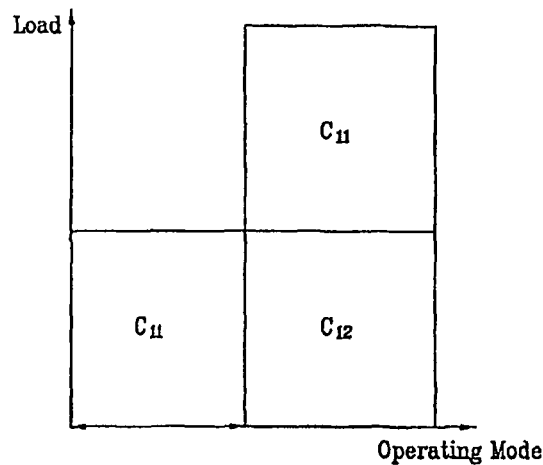
FIG. 6 is a graph of an operational mode of a compressor provided to the air-conditioning system shown in FIG. 5.

If so, it is able to selectively drive the first or second compressor. In particular, the air-conditioning system, as shown in FIG. 6, is able to have a mode for driving the first compressor, i.e., a first constant speed compressor CII only according to an externally applied load or a mode for driving both of the first and second constant speed compressors CII and C12 simultaneously.

Namely, if the external applied load lies within an operational range of the first constant speed compressor, the first constant speed compressor is operated only. If the externally applied load exceeds the operational range of the first constant speed compressor, both of the first and second constant speed compressors are simultaneously operated. It is a matter of course that the second constant speed compressor can be driven only.

For instance, in case of driving the first compressor 100 only using the gaseous refrigerant separated by the phase separator, the on/off valve provided to the second diverging pipe 715 is turned off while the other on/off valve provided to the first diverging pipe 713 is turned on. Of course, the on/off valve provided to the first diverging connecting pipe is turned on while the other on/off valve provided to the second diverging connecting pipe is turned off. In this case, the on/off valves are controlled by the controller (not shown in the drawing) controlling the operations of the air-conditioning system. In particular, the controller controls a flow of the refrigerant introduced into the compressor by controlling whether to turn on or off the corresponding on/off valve according to the externally applied load.

Optionally, the gaseous refrigerant adjusting device of the present invention can include a capillary tube connecting a plurality of the compressors and the phase separator to adjust a flux of the gaseous refrigerant according to its size.

In particular, by preparing a database of information for a gaseous refrigerant quantity and capillary tube required for the operations of the first and second compressors through tests and by testing operational performances of the first and second compressors, i.e., the operational efficiency of the air-conditioning system according to the diameter of the capillary tube, it is able to decide the diameter of the capillary tube within a range that does not affect the operational performances of the first and second compressors considerably.

Namely, for the fluxes of the gaseous refrigerants introduced into the first and second compressors, a quantity of the gaseous refrigerant introduced into the corresponding compressor is adjusted according to the size of the refrigerant pipe connecting the phase separator and a plurality of the compressors.

A system for air conditioning according to a third embodiment of the present invention is explained with reference to FIG. 7 and FIG. 8 as follows.

Figure 7:
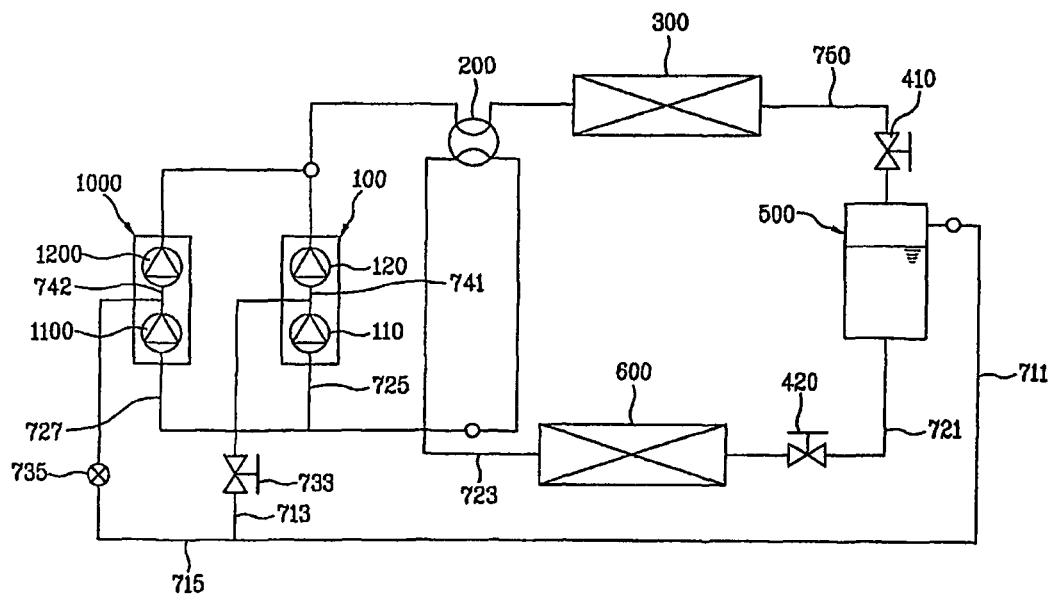
FIG. 7 is a configurational block diagram of a system for air conditioning according to a third embodiment of the present invention.
Figure 8:
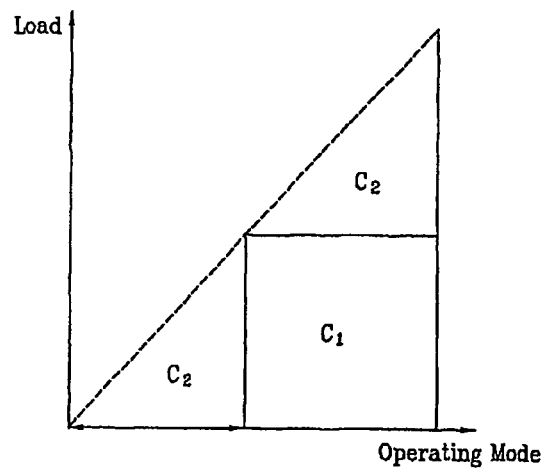
FIG. 8 is a graph of an operational mode of a compressor provided to the air-conditioning system shown in FIG. 7.

FIG. 7 is a configurational block diagram of a system for air conditioning according to a third embodiment of the present invention and FIG. 8 is a graph of an operational mode of a compressor provided to the air-conditioning system shown in FIG. 7.

First of all, a system for air conditioning according to a third embodiment of the present invention almost has the same configuration of the former system according to the second embodiment of the present invention. Yet, a plurality of compressors of the third embodiment of the present invention include a variable compressor (i.e., a first compressor) and a constant speed compressor (i.e., a second compressor). And, an auxiliary electronic expansion valve 733 and an on/off valve 735 are used as a gaseous refrigerant adjusting device to adjust a flux of a gaseous refrigerant introduced into each of the first and second compressors.

In particular, the auxiliary electronic expansion valve 733 is used to control a flow of the gaseous refrigerant used for the first compressor and the on/off valve 735 is used to control a flow of the gaseous refrigerant used for the second compressor. In the following description, a process for driving both of the first and second compressors simultaneously using a gaseous refrigerant separated by a phase separator.

If both of the first and second compressors 100 and 1000 are simultaneously driven, the gaseous refrigerant discharged from the phase separator firstly flow a main refrigerant pipe 711 and is then introduced into the first and second compressors 100 and 1000 via first and second diverging pipes 713 and 715, respectively.

In particular, the refrigerant flowing through the first diverging pipe 713 is introduced into a first intermediate refrigerant pipe 741 connected to the first compressor 100 via the auxiliary electronic expansion valve 733. If so, the gaseous refrigerant via the first diverging pipe 713 and the gaseous refrigerant compressed by a first compressing part 110 provided to the first compressor 100 are mixed with each other in the first intermediate refrigerant pipe 741. The mixed gaseous refrigerant is then introduced into a second compressing part 120 of the first compressor 100.

In this case, since capacity of the first compressor 100 varies according to a load, a controller of the air-conditioning system controls an opening degree of the auxiliary electronic expansion valve 733 to supply a gaseous refrigerant quantity suitable for the load. For instance, if an operational frequency of the first compressor 100 is 80 Hz and if an operational frequency of the second compressor 1100 is 60 Hz, a quantity of the gaseous refrigerant introduced into the first intermediate refrigerant pipe of the first compressor will be greater than that of the gaseous refrigerant introduced into a second intermediate refrigerant pipe of the second compressor.

Simultaneously, the refrigerant flowing through the second diverging pipe 715 is introduced into the second intermediate refrigerant pipe 742 connected to the second compressor 1000 via the on/off valve 735. If so, the gaseous refrigerant via the second diverging pipe 715 and the gaseous refrigerant compressed by the first compressing part 1100 of the second compressor 1000 are mixed with each other in the second intermediate refrigerant pipe 742. The mixed gaseous refrigerant is introduced into a second compressing part 1200 of the second compressor 1000 and is then compressed therein.

Subsequently, the gaseous refrigerant discharged from the first compressor 100 and the gaseous refrigerant discharged from the second compressor 1000 are mixed with each other and are then transferred to a 4-way valve 200.

The gaseous refrigerant having been transferred to the 4-way valve 200 changes its phase into a liquid refrigerant via a condenser 300. The liquid refrigerant expands via a first expansion valve 410 and is then introduced into the phase separator.

Referring to FIG. 8, it is able to drive the variable compressor C2 only according to an externally applied load or both of the variable compressor C2 and the constant speed compressor C1 simultaneously. Namely, only if the external load lies within an operational range of the variable compressor, it is able to drive the variable compressor only. If the external load exceeds the operational range of the variable compressor, both of the variable compressor and the constant speed compressor are simultaneously driven. Optionally, it is also able to drive the constant speed compressor only.

A system for air conditioning according to a fourth embodiment of the present invention is explained with reference to FIG. 9 and FIG. 10 as follows. In this case, the air-conditioning system is provided with a pair of variable compressors.

Figure 9:
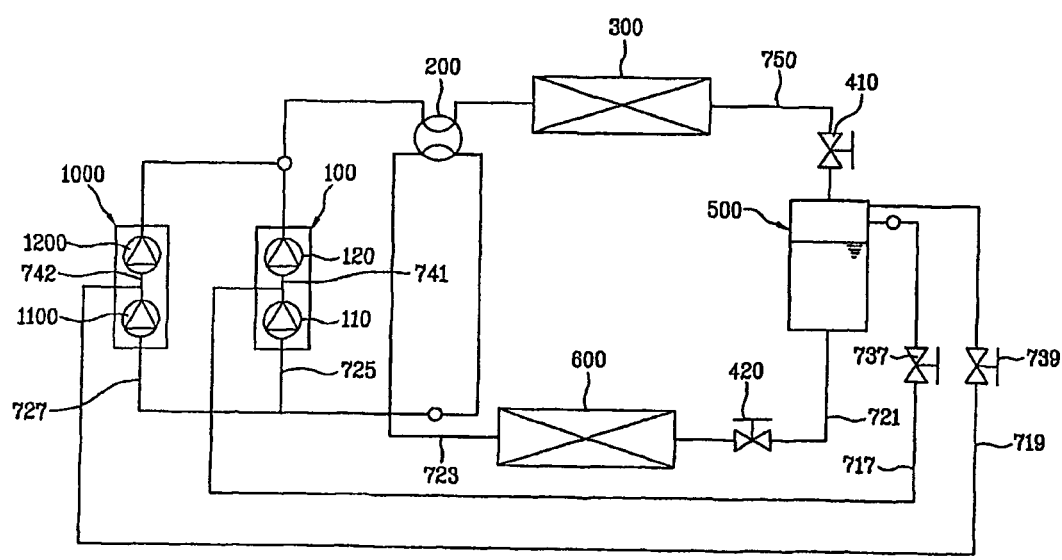
FIG. 9 is a configurational block diagram of a system for air conditioning according to a fourth embodiment of the present invention.
Figure 10:
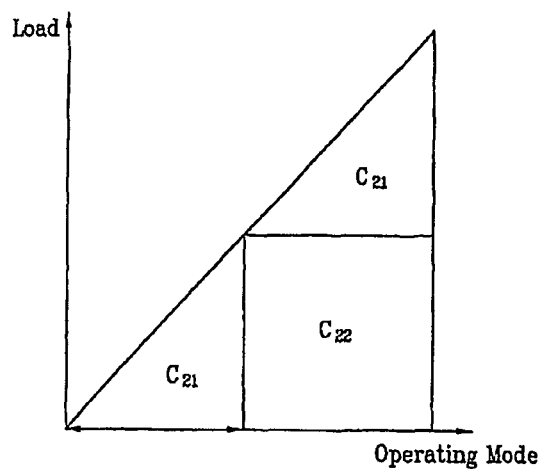
FIG. 10 is a graph of an operational mode of a compressor provided to the air-conditioning system shown in FIG. 9.

FIG. 9 is a configurational block diagram of a system for air conditioning according to a fourth embodiment of the present invention and FIG. 10 is a graph of an operational mode of a compressor provided to the air-conditioning system shown in FIG. 9.

Referring to FIG. 9 and FIG. 10, an air-conditioning system according to a fourth embodiment of the present invention has a configuration approximately similar to those of the aforesaid embodiments. Yet, the air-conditioning system according to the fourth embodiment of the present invention includes a pair of variable compressors, i.e., a first compressor 100 and a second compressor 1000. And, an auxiliary electronic expansion valve is used as a refrigerant adjusting device to adjust a flux of a gaseous refrigerant introduced into each of the first and second compressors 100 and 1000.

In the air-conditioning system according to the fourth embodiment of the present invention, refrigerant pipes connecting a phase separator and a pair of the compressors do not diverge from one refrigerant pipe separately. Instead, the phase separator and the compressors are directly connected.

In particular, the refrigerant pipes include a first gaseous refrigerant pipe 717 enabling a gaseous refrigerant discharged from the phase separator 500 to flow to the first compressor 100 and a second gaseous refrigerant pipe 719 provided parallel with the first gaseous refrigerant pipe 717 to enable a gaseous refrigerant discharged from the phase separator 500 to flow to the second compressor 1000.

Explained in the following description is the case that both of the compressors are driven.

First of all, a portion of the gaseous refrigerant separated by the phase separator 500 is introduced into a first intermediate refrigerant pipe 741 of the first compressor 100 via the first gaseous refrigerant pipe 717. In this case, a first auxiliary electronic expansion valve 737 provided to the first gaseous refrigerant pipe 717 adjusts a flux of the gaseous refrigerant. In particular, a controller of the cir-conditioning system adjusts an opening degree of the first auxiliary electronic expansion valve 737 according to a load applied to the first compressor 100.

The gaseous refrigerant introduced into the first intermediate refrigerant pipe 741 is mixed with a gaseous refrigerant compressed by a first compressing part 110 of the first compressor 100 and is then introduced into a second compressing part 120 of the first compressor 100.

Likewise, the rest of the gaseous refrigerant separated by the phase separator 500 is introduced into a second intermediate refrigerant pipe 742 of the second compressor 1000 via the second gaseous refrigerant pipe 719. In this case, a flux of the corresponding gaseous refrigerant is adjusted in a manner that an opening degree of a second auxiliary electronic expansion valve 739 is adjusted according to a load applied to the second compressor 1000.

Referring to FIG. 10, it is able to drive a first variable compressor C21 only according to an externally applied load or both of the first and second variable compressors C21 and C22 simultaneously. In particular, in case of an external load affordable by the first variable compressor C21, the first variable compressor C21 is driven only. If the external load exceeds the capacity of the first variable compressor C21, both of the first and second compressors C21 and C22 are simultaneously driven. Of course, it is able to drive the second variable compressor C22 only.

A phase separator according to one embodiment of the present invention is explained with reference to FIG. 11 as follows.

Figure 11:
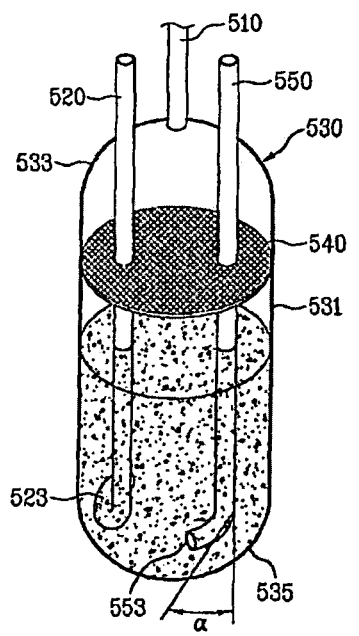
FIG. 11 is a perspective diagram of a phase separator provided to a system for air conditioning according to one embodiment of the present invention.

FIG. 11 is a perspective diagram of a phase separator provided to a system for air conditioning according to one embodiment of the present invention.

Referring to FIG. 11, a phase separator according to one embodiment of the present invention includes a storage container 530 storing a refrigerant therein, a mixed refrigerant pipe connecting part 520 leading the refrigerant to the storage container 530, a separating plate 540 provided with the storage container 530, a first refrigerant pipe connecting part 510 for discharging a gaseous refrigerant separated within the storage container 530, and a second refrigerant pipe connecting part 550 for discharging a liquid refrigerant.

The storage container 530 plays a role in providing a place for storing a refrigerant temporarily. The refrigerant introduced into the storage container 530 is in a state that gaseous and liquid refrigerants are mixed with each other.

The storage container 530 includes a cylindrical body part 531, an upper wall provided to an upper end portion of the body part 531, and a lower wall 535 provided to a lower end portion of the body part 531.

The upper wall 533 has a hemispherical shape convex toward a top of the body part 531 and is built in one body of the body part 531. And, the lower wall 535 has a hemispherical shape convex toward a bottom of the body part 531 and is built in one body of the body part 531.

As each of the upper and lower walls 633 and 535 has the hemispherical shape, a pressure can be evenly distributed within the phase separator. Preferably, a total of a volume enclosed by the upper wall 533 and a volume enclosed by the lower wall 535 is designed to correspond to a half of an overall volume. The above-configured phase separator facilitates the storage container to be manufactured and enables the pressure to be evenly distributed within the storage container.

Preferably, the first refrigerant pipe connecting pipe 510 is located at a most upper end portion of the upper wall 533. Since a gaseous refrigerant has a density lower than that of a liquid refrigerant, it is always located in an upper part of the storage container. Although the gaseous and liquid refrigerants are separated from each other by the separating plate, it is able to efficiently prevent the liquid refrigerant from being discharged via the first refrigerant pipe connecting part 510 in a manner of discharging a gaseous refrigerant most distant from the liquid refrigerant.

Each of the mixed refrigerant pipe connecting part 520 and the second refrigerant pipe connecting part 550 is installed in a manner of perforating the upper wall 533, extending downwardly, and being spaced apart from the lower wall 535 to leave a prescribed gap in-between. In particular, the second refrigerant pipe connecting part 550 is preferably installed to have the same height of the mixed refrigerant pipe connecting part 520 by considering that a direction of a refrigerant flow is changed according to a heating or cooling operation.

Preferably, each of the mixed refrigerant pipe connecting part 520 and the second refrigerant pipe connecting part 550 is configured to extend to reach a position below 1A of an overall height of the storage container. Since the liquid refrigerant always remains near the lower wall 535 of the storage container regardless of the heating or cooling operation of the air-conditioning system, each of the mixed refrigerant pipe connecting part 520 and the second refrigerant pipe connecting part 550 should be always dipped in the liquid refrigerant.

A lower end portion 523 of the second refrigerant pipe connecting part 550 is bent at a prescribed angle α. And, a lower end portion 553 of the mixed refrigerant pipe connecting part 550 is bent at a prescribed angle α. Each of the lower end portions 523 and 553 is bent in a circumferential direction along the lower wall 535. This is to enable the refrigerants introduced into the storage container to smoothly rotate and flow along the lower wall 535 or the body part.

If the refrigerants smoothly flow within the storage container 530, a probability in generating a turbulence of a refrigerant flow is lowered. So, it is less probable that the liquid refrigerant is introduced into the first refrigerant pipe connecting part 510 or that the gaseous refrigerant is introduced into the second refrigerant pipe connecting part 550.

Preferably, a bent degree of each of the lower end portions 523 and 553, i.e., the angle a is set to 25°~45°. And, each of the lower end portions 523 and 553 has a smooth arc shape. Moreover, a radius R of the arc is four times greater than a diameter of each of the mixed refrigerant pipe connecting part 520 and the second refrigerant pipe connecting part 550. In this case, the angle a and the radius R are the values for reducing the turbulence generation in the volume and shape of the phase separator.

A diameter of the first refrigerant pipe connecting part is configured equal to or smaller than that of the second refrigerant pipe connecting part. In particular, the diameter of the first refrigerant pipe connecting part is preferably set to a value between ½-1 time of the diameter of the second refrigerant pipe connecting part.

As the diameter of the first refrigerant connecting part is reduced, it gets more difficult to discharge the liquid refrigerant via the first refrigerant pipe connecting part. Since a flow of the gaseous refrigerant discharged via the first refrigerant pipe connecting part 510 is controlled by the refrigerant control valve, a smaller flux of the gaseous refrigerant flowing through the first refrigerant pipe connecting part 520 is preferred.

The separating plate 540 includes a porous member having a multitude of perforated holes enabling a gaseous refrigerant to pass through. Optionally, a locking means for locking the storage container and the separating plate together can be provided to an edge of the separating plate 540.

The separating plate 540 is provided to a lower part of the upper wall 533 to play a role in removing particles from the gaseous refrigerant discharged via the first refrigerant pipe connecting part 510 and preventing the liquid refrigerant from being introduced into the first refrigerant pipe connecting part 510.

In particular, the separating plate 540 is able to effectively prevent the liquid refrigerant from being discharged via the first refrigerant pipe connecting part due to an abrupt pressure change in driving the compressor. So, if the refrigerant is introduced into the storage container 530 via the mixed refrigerant pipe connecting part 520, the gaseous refrigerant of the refrigerant is discharged to the compressor via the separating plate 540 and the first refrigerant pipe connecting pipe 510.

On the other hand, the liquid refrigerant collides with the separating plate 540 to fall under the separating plate 540. And, the liquid refrigerant stored under the separating plate 540 is discharged via the second refrigerant pipe connecting part 550 and is then introduced into the second expansion valve (cf. '420' in FIG. 3).

A phase separator according to another embodiment of the present invention is explained with reference to FIG. 12 as follows.

Figure 12:
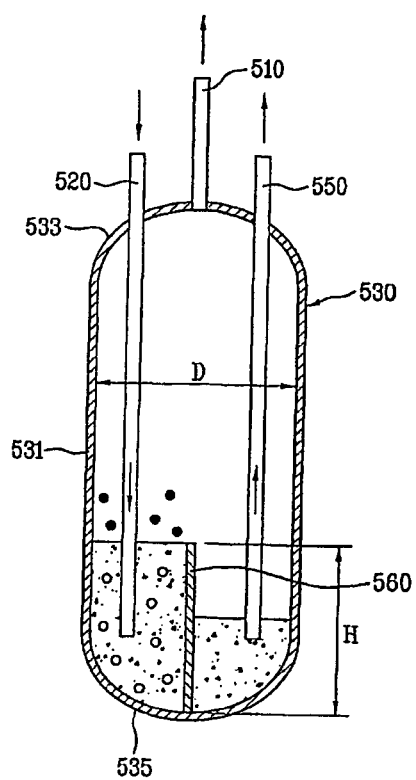
FIG. 12 is a cross-sectional diagram of a phase separator provided to a system for air conditioning according to another embodiment of the present invention.

FIG. 12 is a cross-sectional diagram of a phase separator provided to a system for air conditioning according to another embodiment of the present invention.

Figure 13:
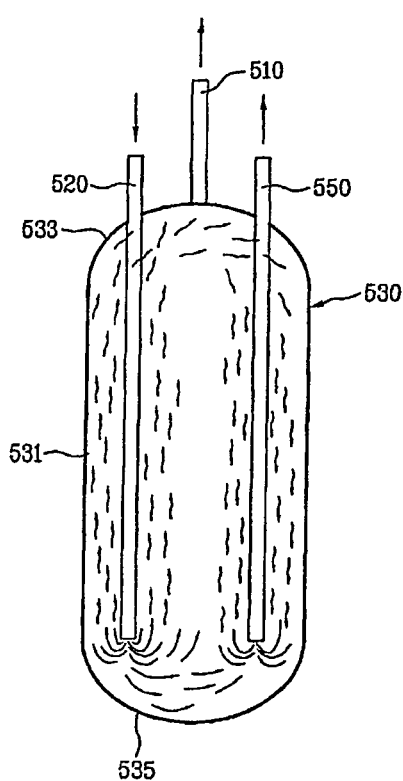
FIG. 13 and FIG. 14 are diagrams to explain performance of the phase separator shown in FIG. 12.
Figure 14:
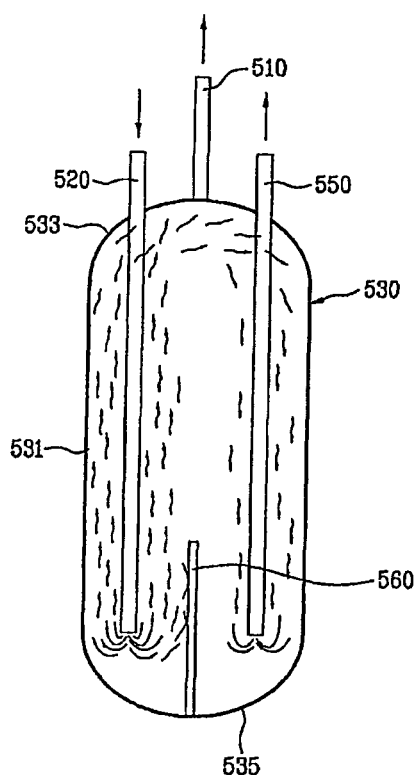

Referring to FIG. 12, a configuration of a phase separator according to another embodiment of the present invention is similar to that of the phase separator according to the former embodiment of the present invention. Yet, the phase separator according to the present embodiment includes a barrier wall 560 preventing a flow of a refrigerant discharged from a mixed refrigerant pipe connecting part 520 from affecting a second refrigerant pipe connecting part 550 or a first refrigerant pipe connecting part 510. FIG. 13 shows a flow of a mixed refrigerant in case of not installing the barrier wall 560, while FIG. 14 shows a flow of a mixed refrigerant in case of installing the barrier wall 560.

The barrier wall 560 is provided between a lower end portion of the mixed refrigerant pipe connecting part 520 and a lower end portion of the second refrigerant pipe connecting part 550 to adjust a flow of a refrigerant discharged from the mixed refrigerant pipe connecting part 520.

In particular, if a mixed refrigerant including liquid and gaseous refrigerants mixed with each other belches into a storage container 530 via the mixed refrigerant pipe connecting part 520, the mixed refrigerant generates turbulence by hitting a lower wall 535 of the storage container 530. In doing so, the barrier wall 560 guides a flow of the mixed refrigerant.

Namely, the barrier wall 560 guides the flow of the refrigerant in a direction of a wall of the storage container to prevent the mixed refrigerant discharged from the mixed refrigerant pipe connecting part 520 from being directly sucked into the second refrigerant pipe connecting part 550.

Consequently, it becomes less probable that bubbles included in the mixed refrigerant discharged from the mixed refrigerant pipe connecting part 520 may be introduced into the second and first refrigerant pipe connecting parts 550 and 510. So, the barrier wall 560 enables the liquid refrigerant to be efficiently introduced into the second refrigerant pipe. And, the barrier wall 560 eventually prevents the liquid refrigerant from being introduced into a cylinder of a compressor. Preferably, the mixed refrigerant pipe connecting part is configured to have a diameter equal to that of the second refrigerant pipe connecting part. This is because the air-conditioning system is capable of performing a heating operation as well as a cooling operation.

Meanwhile, the barrier wall 560 is installed to have a predetermined height from a bottom of the lower wall 535. In particular, a height H of the barrier wall 560 is set to a height 1-2 times of a diameter D of the storage container 530.

The height H of the barrier wall 560 should be set enough to prevent the bubbles included in the mixed refrigerant abruptly discharged from the mixed refrigerant pipe connecting part 520 from being directly introduced into the second refrigerant pipe connecting part 550 in driving the system and to enable the liquid refrigerant to be smoothly introduced into the second refrigerant pipe connecting part 550 in a normal operation of the system.

In particular, if the height H of the barrier wall 560 is too big, it is able to easily prevent the bubbles from being introduced into the second refrigerant pipe connecting part 550 in case of driving the system. Yet, since the mixed refrigerant pipe connecting part 520 is partitioned from the second refrigerant pipe connecting part 550, the liquid refrigerant may be not introduced into the second refrigerant pipe connecting part 550 in case of a normal operation of the system.

If the height H of the barrier wall 560 is too small, the bubbles may be directly introduced into the second refrigerant pipe connecting part 550 in driving the system. So, it is preferable that the height H of the barrier wall 560 is set 1.5 time of the diameter D of the storage container 530.

A shape of the barrier wall 560 can be variously modified. For instance, an end portion of the barrier wall 560 can be smoothly curved in a direction of the mixed refrigerant pipe connecting part. If the end portion of the mixed refrigerant pipe connecting part has a smooth curve, it is able to further smoothen the flow of the mixed refrigerant.

An operational state of the compressor of the air-conditioning system according to the first embodiment of the present invention is explained with reference to FIG. 2 and FIG. 15 as follows.

Figure 15:
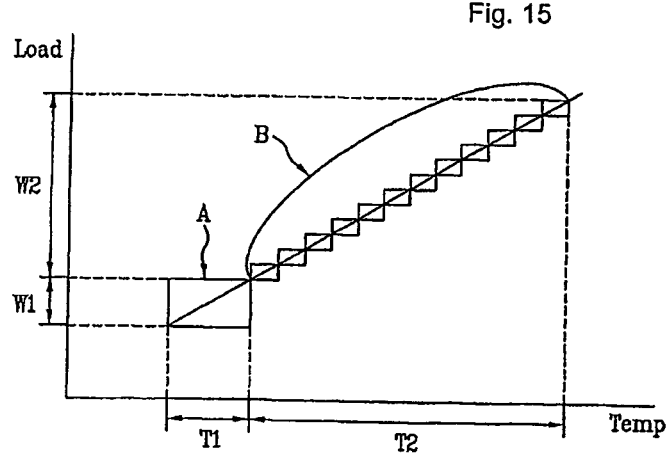
FIG. 15 is a graph of an operational mode of a compressor according to an external load in the air-conditioning system.

FIG. 15 is a graph of an operational mode of a compressor according to an external load in the air-conditioning system.

In a cooling operation for cooling an indoor space, a compression work externally applied to a compressor, i.e., an external load is proportional to an external temperature. Yet, the external load does not always mean a function of the external temperature only. And, the external load can be decided by considering a count of indoor units, an indoor space temperature, a setup temperature, etc. In the following description, the external temperature is taken into consideration to explain the external load.

For instance, if an external temperature is low, it is less necessary to cool an indoor space. If an external load is small and if an external temperature is high, a relatively more work should be supplied to an air-conditioning system to cool the indoor space. So, the external load becomes large. On the other hand, in case of heating an indoor space, if an external temperature is low, an external load becomes large. If an external temperature is high, an external load becomes small.

As mentioned in the detailed description relating to FIG. 2, if an external load is big, i.e., if the air-conditioning system is in a cold or tropical ame, the air-conditioning system has a refrigerant flow that a gaseous refrigerant separated by the phase separator is introduced into the second compressing part 120 by being mixed with the refrigerant via the first compressing part 110. Of course, if the external load is small, either the first compressing part or the second compressing part is driven only.

In FIG. 15, a rectangular figure represented according to an external load and an external temperature indicates a compression work that should be externally applied to a compressor. And, a rectangle-A means a compression work applied to a compressor in case of driving the first compressing part. A rectangle in an area-B indicates each compression work variably supplied to the second compressing part according to an external load.

If an external load, i.e., an overall compression work needing to be applied to the compressor is (W1+W2), a compression work W1 is supplied to the first compressing part 110 and a compression work W2 is supplied to the second compressing part 120.

If an external load needing to be applied to the air-conditioning system corresponds to the section W1, the first compressing part will be driven only in the air-conditioning system. Optionally, the first compressing part can be variably changed according to the external load.

An operational efficiency of the compressor of the air-conditioning system according to the first embodiment of the present invention is explained with reference to HG. 2, FIG. 4, and FIG. 16 as follows.

Figure 16:
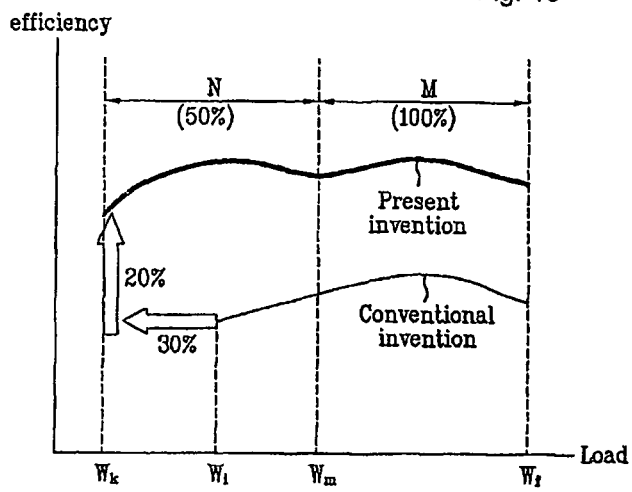
FIG. 16 is a graph of an operational mode of a compressor according to an external load in the air-conditioning system shown in FIG. 15.

FIG. 16 is a graph of an operational mode of a compressor according to an external load in the air-conditioning system shown in FIG. 15.

In general, major factors in deciding performance of a compressor include a capacity of the compressor and an energy consumption rate of the compressor. In this case, the capacity of the compressor is determined in a process for manufacturing the compressor to be suitable for a corresponding air-conditioning system. So, in spite of a same compressor capacity, it is necessary to reduce energy consumption to extend an operational area of an air-conditioning system.

Referring to FIG. 16, a related art air conditioner system is operable in an area having an external load range between Wi and Wf only. Namely, an operational range of the related art air conditioner depends on a compressor capacity only.

Yet, the air-conditioning system according to the present embodiment is operable in an external load range between Wk and Wf. In the air-conditioning system, by supplying a gaseous refrigerant to the second compressing part 120 together with a refrigerant compressed by the first compressing part 110, a compression work applied to the compressor and an energy consumption are reduced. So, despite the same output, an overall efficiency of the air-conditioning system is increased. Hence, although the compressor has the same capacity of the related art compressor, the operational area of the air-conditioning system is more extended.

In particular, if a volume ratio (MN) between the first cylinder 111 and the second cylinder 121 is 10050, the operational area of the air-conditioning system according to the present invention is increased by 30% more than that of the related art. And, the operational efficiency is increased by 20% more than that of the related art.

In aspect of COP (coefficient of performance) of the air-conditioning system, since a compression work consumed for obtaining a same cooling power, i.e., a power consumption is reduced, it can be observed that a COP is increased. Of course, since a COP is big if a same compression work of the related art is provided to the air-conditioning system, a COP is big. So, it can be seen that a cooling power is increased.

In this case, a COP can be theoretically represented as an absorption enthalpy of an evaporator for an enthalpy of a compressor. Substantially, an enthalpy of the compression work means a real power consumption and the absorption enthalpy of the evaporator means the cooling power.

Consequently, it is able to increase the operational efficiency of the air-conditioning system by driving the compressor using the gaseous refrigerant separated by the phase separator and to extend the operational area. As the operational area of the air-conditioning system is increased, the air-conditioning system is operable in a cold or tropical aane.

Figure 17:
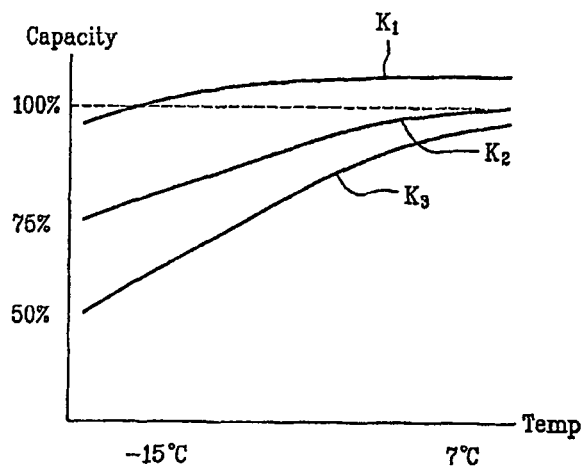
FIG. 17 is a graph of performance of an air-conditioning system according to the present invention.

FIG. 17 is a graph of performance of an air-conditioning system according to the present invention, in which a compression capacity of a compressor for a temperature is shown. And, the compression capacity is a value with reference to a compression capacity according to a temperature in case of using a variable compressor only.

Referring to FIG. 17, assuming that a compression capacity of a case K2 of using a variable compressor only is about 78 if a temperature is −15° C., a compression capacity of a case K3 of using a constant speed compressor only becomes about 55. In the case K1 of using a compressor according to the present invention, a compression capacity of a compressor including a plurality of variable compressors, each of which includes a first compressing part receiving a gaseous refrigerant via an evaporator and a second compressing part using a gaseous refrigerant separated by a phase separator, becomes 100.

Assuming that a compression capacity of a case K2 of using a variable compressor only is 100 if a temperature is 7° C., a compression capacity of a case of using a constant speed compressor only is about 93. And, a compression capacity of the case K1 of using a compressor according to the present invention is about 110.

The compressor according to the present invention can employ a plurality of compressors or a combination thereof only if each of a plurality of the compressors includes a first compressing part and a second compressing part. For instance, a plurality of compressors according to the present invention can include a plurality of constant speed compressors each of which is provided with first and second compressing parts, a plurality of variable compressors each of which is provided with first and second compressing parts, or a plurality of variable and constant speed compressors each of which is provided with first and second compressing parts.

Based on the data, the compressor according to the present invention has a considerably large compression capacity in a cold area at a relatively low temperature. Namely, an operational area of the air-conditioning system configured with a plurality of compressors, each of which includes first and second compressing parts, arranged parallel with each other has a wider operational range in a cold area. Alternatively, a plurality of the compressors can be arranged in series.

INDUSTRIAL APPLICABILITY

The present invention can reduce a compression work applied to a compressor and increase overall efficiency of an air-conditioning system. Further, the present invention is able to extend an operational area of an air-conditioning system. In particular, the present invention is able to extend an operational area in a cold area.

What we claim is:
1. An air-conditioning system comprising:
a phase separator separating a gaseous refrigerant and a liquid refrigerant from a flowing refrigerant, the phase separator including a storage container for storing the gaseous and liquid refrigerants mixed with each other therein, a mixed refrigerant pipe connecting part guiding the mixed refrigerant to the storage container, a first refrigerant pipe connecting part discharging the separated gaseous refrigerant, a second refrigerant pipe connecting part discharging the separated liquid refrigerant and a barrier wall provided at a lower wall, under the first refrigerant pipe connecting part,
an evaporator evaporating the liquid refrigerant separated by the phase separator; and
a plurality of compressors including first compressor and second compressor independently operable, each of first compressor and second compressor comprising:
a first compressing part receiving the refrigerant via the evaporator;
a second compressing part receiving both of the gaseous refrigerant separated by the phase separator and the refrigerant via the first compressing part, wherein a volume of a first cylinder of the first compressing part is different from a volume of a second cylinder of the second compressing part; and
an intermediate refrigerant pipe connecting the first compressing part and the second compressing part together to provide a space for mixing the gaseous refrigerant separated by the phase separator and the refrigerant via the evaporator together,
a first gaseous refrigerant pipe enabling the gaseous refrigerant discharged from the phase separator to flow into the intermediate refrigerant pipe of the first compressor;
a second gaseous refrigerant pipe provided parallel with the first gaseous refrigerant pipe to enable the gaseous refrigerant discharged from the phase separator to flow into the intermediate refrigerant pipe of the second compressor;
a first auxiliary electronic expansion valve provided to the first gaseous refrigerant pipe, the first auxiliary electronic expansion valve controlling a flow of the gaseous refrigerant introduced into the intermediate refrigerant pipe of the first compressor;
a second auxiliary electronic expansion valve provided to the second gaseous refrigerant pipe, the second auxiliary electronic expansion valve controlling a flow of the gaseous refrigerant introduced into the intermediate refrigerant pipe of the second compressor;
wherein, the first compressing part and the second compressing part are operated selectively according to an external load,
wherein, the first compressor and the second compressor are variable compressors having a compression capacity variable, and the first compressor and the second compressor are operated selectively according to an external load, wherein, opening degree of the first auxiliary electronic expansion valve and the second auxiliary electronic expansion valve are independently adjusted according to a load applied to the first compressor and the second compressor, wherein the storage container comprises a body part, an upper wall provided to an upper end portion of the body part, and a lower wall provided to a lower end portion of the body part, wherein a lower end portion of the mixed refrigerant pipe connecting part and a lower end portion of the second refrigerant pipe connecting part are dipped in the mixed refrigerant to be spaced apart from the lower wall with a prescribed gap in-between, wherein the barrier wall is installed to have a predetermined height from the lower wall, and wherein the height of the barrier wall is longer than the gap.

2. The air-conditioning system of claim 1, wherein the volume of the second cylinder amounts to 40-80% of the volume of the first cylinder.

3. The air-conditioning system of claim 1, wherein the barrier wall is provided under the first refrigerant pipe connecting part to remove particles from the gaseous refrigerant discharged from the first refrigerant pipe connecting part and prevent the liquid refrigerant from being introduced into the first refrigerant pipe connecting part.

4. The air-conditioning system of claim 1,
wherein the upper wall is upwardly convex; and
the lower wall is downwardly convex.

5. The air-conditioning system of claim 4, wherein the first refrigerant pipe connecting part is provided to a most upper end of the upper wall.

6. The air-conditioning system of claim 1, wherein the barrier wall is provided between a lower end portion of the mixed refrigerant pipe connecting part and a lower end portion of the second refrigerant pipe connecting part to prevent a flow of the refrigerant discharged from the mixed refrigerant pipe connecting part from affecting the second refrigerant pipe connecting part or the first refrigerant pipe connecting part.

7. The air-conditioning system of claim 6, wherein a height of the barrier wall is 1-2 times greater than a diameter of the storage container.

8. An air-conditioning system comprising:
a phase separator separating a gaseous refrigerant and a liquid refrigerant from a flowing refrigerant, the phase separator including a storage container for storing the gaseous and liquid refrigerants mixed with each other therein, a mixed refrigerant pipe connecting part guiding the mixed refrigerant to the storage container, a first refrigerant pipe connecting part discharging the separated gaseous refrigerant; a second refrigerant pipe connecting part discharging the separated liquid refrigerant and a barrier wall provided at a lower wall, under the first refrigerant pipe connecting part, an evaporator evaporating the liquid refrigerant separated by the phase separator; and a plurality of compressors including first compressor and second compressor independently operable, each of first compressor and second compressor comprising:

a first compressing part receiving the refrigerant via the evaporator;

a second compressing part receiving both of the gaseous refrigerant separated by the phase separator and the refrigerant via the first compressing part, wherein a volume of a first cylinder of the first compressing part is different from a volume of a second cylinder of the second compressing part; and an intermediate refrigerant pipe connecting the first compressing part and the second compressing part together to provide a space for mixing the gaseous refrigerant separated by the phase separator and the refrigerant via the evaporator together, wherein, the first compressing part and the second compressing part are operated selectively according to an external load, wherein, the first compressor and the second compressor are variable compressors having a compression capacity variable, and the first compressor and the second compressor are operated selectively according to an external load, wherein the storage container comprises a body part, an upper wall provided to an upper end portion of the body part, and the lower wall provided to a lower end portion of the body part, wherein a lower end portion of the mixed refrigerant pipe connecting part and a lower end portion of the second refrigerant pipe connecting part are dipped in the mixed refrigerant to be spaced apart from the lower wall with a prescribed gap in-between, wherein the barrier wall is installed to have a predetermined height from a lower and wall, and wherein the height of the barrier wall is longer than the gap.

* * * * *